Aug. 24, 1965
H. W. SMITH
3,201,934
EXHAUST-LIQUID HEAT EXCHANGER FOR INTERNAL
COMBUSTION ENGINES
Filed Aug. 6, 1962
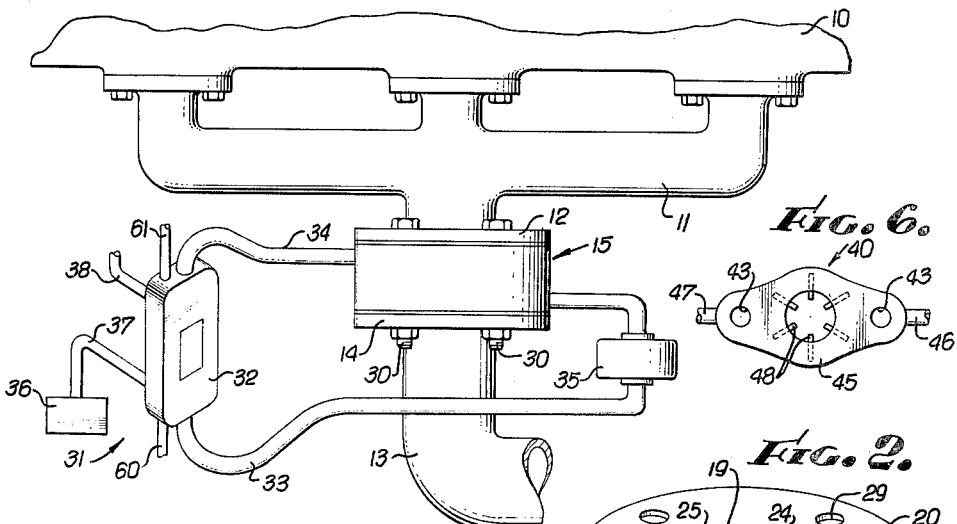
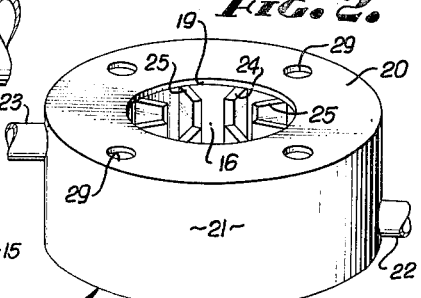
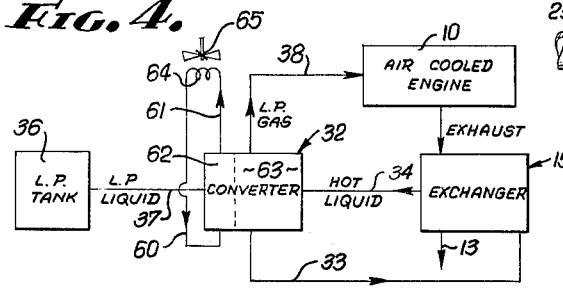
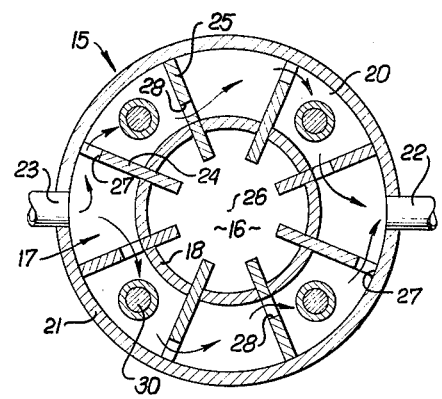
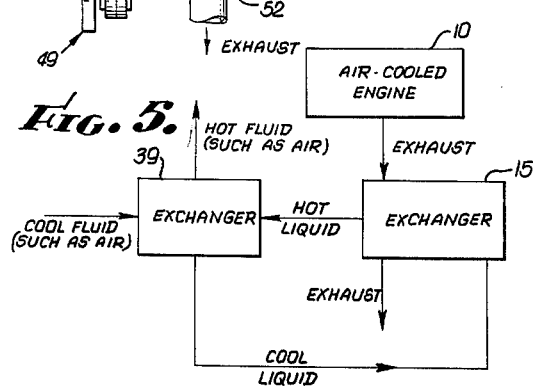
INVENTOR.
HAROLD W. SMITH
BY
White & Haefliger
ATTORNEYS.

United States Patent Office 3,201,934
Patented Aug. 24, 1965

3,201,934
EXHAUST-LIQUID HEAT EXCHANGER FOR
INTERNAL COMBUSTION ENGINES
Harold W. Smith, 2449 Ridgeway Road,
San Marino, Calif.
Filed Aug. 6, 1962, Ser. No. 215,004
2 Claims. (Cl. 60—31)

This invention relates generally to internal combustion engine exhaust systems, and more particularly relates to a novel heat exchanger unit for recovering heat from an air cooled internal combustion engine exhaust stream. As will appear, the invention is also concerned with the combination of the novel heat exchanger unit with secondary heat exchanger means of various types serving fluid heating purposes.

In the past, LPG fuel systems for the liquid cooled engines have made use of the engine heated coolant by circulating it to an LPG converter for transferring heat to, and thereby vaporizing, the liquified petroleum gas. As a result, the efficiency of the power plant is increased because otherwise wasted heat is recovered and made use of for fuel vaporization purposes, and the high temperature of the coolant is reduced. Since air cooled internal combustion engines lack a liquid coolant system, a problem exists as to how, efficiently, to vaporize the LPG being supplied to the engine.

The above mentioned problem, and other problems associated with engine heat recovery, are solved by the present invention through the provision of a novel heat exchanger unit by means of which engine exhaust heat is recovered. The unit is constructed for combination with an internal combustion engine exhaust system having a flanged outlet from the exhaust manifold and a flanged inlet to the exhaust pipe. For this purpose, the unit typically comprises inner and outer chambers forming first and second passages for flowing hot exhaust and other fluid respectively in heat exchange relation, the inner chamber extending endwise through the unit. The latter is then mounted between the mentioned flanges so that the first passage is connected in series with the manifold outlet and the exhaust pipe inlet, with the fastener openings in the flanges receiving connectors passing through the unit to hold it in mounted position. Also, the unit typically includes heat exchanger fins projecting into the first and second passages for transferring heat from the exhaust in the first passage to the other fluid in the second passage.

Also, the invention is concerned with the combination of the heat exchanger unit as described with secondary heat exchanger means having connection with the unit for flowing the heated other fluid to the secondary exchanger. For example, the above described heat exchanger unit may be connected with an LPG converter in an LPG fuel supply system, for vaporizing the LPG in the converter. The latter is connected with the fuel intake to deliver vaporized LPG thereto. As another example, the secondary exchanger may comprise an air heater for receiving heated fluid from the described exchanger unit in order to heat air supplied to passenger or storage compartments of a vehicle.

These and other features and objects of the invention, as well as the details of certain illustrative embodiments, will be understood more fully from the following detailed description of the accompanying drawings, in which:

FIG. 1 shows the heat exchanger unit connected in series in the engine exhaust line, with an LPG converter connected to the unit;

FIG. 2 shows the heat exchanger unit in perspective;

FIG. 3 shows the unit in section;

FIG. 4 is a flow diagram showing the use of the heat exchanger unit in an LPG fuel supply system for an air cooled engine;

FIG. 5 is a flow diagram showing the heat exchanger unit in combination with an auxiliary or secondary heat exchanger, such as an air heater;

FIG. 6 is a plan view of an oblong heat exchanger unit; and

FIG. 7 illustrates an LPG converter connected to a heat exchanger unit of the present invention.

Referring first to FIGS. 1 and 4, an internal combustion engine, typically air cooled, is shown at 10, the engine having an exhaust manifold 11 provided with a flanged outlet shown at 12. The exhaust system also includes an exhaust pipe 13 provided with a flanged inlet 14, the flanges 12 and 14 normally being directly connected by suitable bolts.

In accordance with the invention, a heat exchanger unit, such as that typically shown at 15, is mounted between the flanges in such relation that a first passage through the unit is connected in series with the flanged outlet and inlet of the exhaust system. The unit also has a second passage for passing other fluid respectively in heat exchange relation with the exhaust passage extending through the unit.

Extending the description to FIGS. 2 and 3, the unit 15 is typically constructed in the form of inner and outer chambers which form first and second passages respectively shown at 16 and 17 for flowing hot exhaust and other fluid respectively in heat exchange relation. The first passage 16 extends endwise through the unit within the confines of an inner partition 18, and between openings 19 formed by end plates 20, which are typically annular or elongated. A second or outer partition 21 extends about the first partition 18 in spaced relation thereto, and both of these may be concentric as illustrated in FIG. 3.

The end plates 20 and partitions 18 and 21 enclose the second passages 17 in such manner that fluid may circulate therethrough without coming in contact with the hot exhaust flowing endwise through the first passage 16. Such circulation of other fluid is shown in FIG. 3 as entering the second passage at lower inlet 22 and leaving at upper outlet 23, for thermo siphon circulation.

The unit 15 also includes fins typically shown at 24 and 25, which project in radial and endwise extending planes, and which are circularly spaced about the axis 26 of the unit. The fins also project into the first and second passages 16 and 17, for absorbing heat from the exhaust gas flowing through the passage 16, and for conducting such heat to the other fluid flowing through the second passage 17. Typically the fins contain openings such as those illustrated at 27 and 28 in the fins 24 and 25 respectively, which openings are located at varying distances from the axis 26 to form tortuous paths for the flow of the other fluid in the second passage, all for the purpose of efficient heat transfer thereto by conduction through the fins and partition 18. In this connection, it is understood that the unit 15 may be made of suitable metal, and may comprise an iron casting with aluminum or other metallic fins 24 and 25 for providing rapid conduction of heat.

A very desirable feature concerns the manner of mounting the unit 15 between the flanges 12 and 14. For this purpose, the end plates 20 are provided with fastener openings 29 for registration with similar openings in the flanges, in order to receive connectors such as elongated bolts 30 passing through the flanges and unit 15. FIG. 3 shows the bolts 30 extending through the second passage 17 without obstructing fluid flow therethrough. Accordingly, a highly compact and easily mounted unit 15 is provided by the invention.

Referring again to FIGS. 1 and 4, the exchanger 15 is shown in combination with an LPG fuel supply system 31 having a converter 32 connected in series with the second passage 17 of the unit 15, as by ducting shown at 33 and 34 for circulating fluid between the converter and the unit 15. In addition to thermo siphon circulation, a circulating pump may be provided as is indicated generally at 35 in the duct 33. The fluid may typically comprise that known commercially as Ambiflo, Glycol, Dowtherm, or other satisfactory heat transfer fluid.

The converter itself is a known piece of equipment wherein liquid LP gas is expanded to vapor and reduced to a constant lower pressure in a primary regulator. From the latter the fuel passes to a secondary regulator typically lowering the pressure to above or below atmospheric and near to same. The hot fluid circulating through the converter from the exchanger 15 offsets the refrigeration which occurs upon expanding the liquid LPG to vapor. Commercially available converters of this type are manufactured by the American Liquid Gas Corporation of Los Angles, California, under the trade names MET–R–FLO and ALGAS units. Merely for purposes of illustration, LPG is shown as supplied to the converter 32 from a tank 36 and through a line 37, the expanded gas then being supplied as fuel to the air cooled engine through a line 38.

FIG. 4 also shows lines 60 and 61 for circulating heat transfer fluid through a first stage expansion zone 62 of the converter in which the LPG is initially expanded and cooled in heat transfer relation to such fluid, and prior to second stage expansion and cooling of the LPG in zone 63. Lines 60 and 61 circulate the refrigerant fluid through an external coil 64, and a fan 65 may be provided to circulate air over the coil to be cooled thereby.

Referring now to FIG. 5 the heat exchanger unit 15 is shown in combination with a secondary heat exchanger 39. In the diagram, hot liquid is supplied to the exchanger 39 from the unit 15, and cooler liquid is recirculated from exchanger 39 to the passage 17 of the unit 15. The exchanger 39 operates to warm or heat auxiliarly fluid such as air or liquid, and may therefore comprise an air or liquid heater for use in warming the passenger or space compartment of the vehicle by the engine 10.

FIG. 6 illustrates an oblong heat exchanger unit 40 having two bolt holes 43, and shaped for reception between the ordinary flanges of air engine exhaust manifold outlet and exhaust pipe inlet. This construction allows the unit to be installed close to the engine where there is limited clearance. The exhaust passing inner chamber is shown at 44, the oblong outer chamber for passing heat exchanger fluids shown at 45, and the fluid inlet and outlet ducts are illustrated at 46 and 47. Heat exchange fins appear at 48.

In FIG. 7 the LP converter 49 is integrally attached to the heat exchanger unit 50 at the general location 51. Cool heat exchange liquid circulates from the converter to the exchanger and within the latter along the path designated by the arrows 52. Ports are provided within the connection at 51 to pass the circulating liquid between the converter and exchanger.

I claim:
1. In combination, an internal combustion engine exhaust manifold and exhaust line, said line and manifold having spaced apart terminal flanges, a heat exchanger unit in the space between said flanges, said unit comprising inner and outer partitions forming inner and outer passages for flowing hot exhaust and other fluid respectively in heat exchange relation, said inner passage extending endwise openly through said unit and in exhaust passing series relation with the manifold and exhaust line, said unit including heat transfer fins defining generally endwise extending planes within both passages so as not to restrict the endwise flow of exhaust and said other fluid in said inner and outer passages respectively, said inner passage having an endwise extending axis, the fins in both passages being spaced about said axis and having openings to pass the flow of said other fluid about said axis and in tortuous relation within the outer passage, the unit having end plates acting with said partitions to enclose said outer passage, said terminal flanges having perforations, connectors received by said perforations to connect said end plates to the flanges, and said outer partition having inlet and outlet ports to circulate said other fluid about the outer passage.

2. The combination of claim 1 including an LPG fuel supply system having an LPG converter with a hollow interior portion connected in series with said outer passage for circulating said other fluid therebetween in order to vaporize the LPG in the converter, the converter being connectible with the engine fuel intake to deliver vaporized LPG thereto.

References Cited by the Examiner

UNITED STATES PATENTS

| | | | |
|---|---|---|---|
| Re. 14,501 | 8/18 | Lamar | 123—122 X |
| 1,091,501 | 3/14 | Frisbie | 123—122 |
| 1,198,013 | 9/16 | Dempsey | 123—122 X |
| 1,248,954 | 12/17 | Trotter | 165—52 |
| 1,269,753 | 6/18 | Schum | 165—52 |
| 1,271,143 | 7/18 | Douaud | 165—52 |
| 1,777,949 | 10/30 | Whiteman | 165—52 |
| 2,613,658 | 10/52 | Coffey | 123—120 X |
| 2,948,516 | 8/60 | Martinelli et al. | 165—107 X |

SAMUEL LEVINE, *Primary Examiner.*
JULIUS E. WEST, *Examiner.*